United States Patent Office 3,375,083
Patented Mar. 26, 1968

3,375,083
METHOD FOR THE PREPARATION OF COMPLEX
FLUORONITRONIUM SALTS
Stephen J. Kuhn, Sarnia, Ontario, Canada, assignor to The Dow Chemical Company, Midland, Mich., a corporation of Delaware
No Drawing. Filed Dec. 19, 1963, Ser. No. 331,932
6 Claims. (Cl. 23—356)

ABSTRACT OF THE DISCLOSURE

A process for preparing complex fluoronitronium salts which comprises introducing nitrylchloride and anhydrous hydrogen fluoride into a solvent for the reactants along with a Lewis acid fluoride, agitating the mixture at a temperature below 20° C. whereby the corresponding nitronium salt product precipitates in the reaction mass and separating this salt product from the residual reaction mixture.

---

This invention relates to fluoronitronium salts and, more particularly, is concerned with a novel method for the preparation of high purity complex fluoronitronium salts.

The existence and characteristics of solid fluoronitronium salts such as nitroium tetrafluororate, nitronium hexafluorophosphate and nitronium hexafluoroantimonate, for example, have been known for some time.

These salts at present ordinarily are prepared by one of the following techniques:

(1) Nitrogen peroxide together with bromine trifluoride acts on a suitable material such as metal, oxide or oxysalt of a halide which is capable of reacting on the bromine trifluoride either as a Lewis acid or base [Woolf and Emeleus, J. Chem. Soc., 1050 (1950)];

(2) Preparation of nitryl fluoride and subsequent reaction of this compound with a suitable Lewis acid, e.g., a non-metallic fluoride [Aynsley, Hetherington and Robinson, J. Chem. Soc., 119 (1954)];

(3) Adding a mixture of anhydrous hydrofluoric acid and an appropriate fluoride compound to a preparation of dinitrogen pentoxide dissolved in nitromethane [Schmeisser and Elisher, Z. Naturforsch, 7b, 583 (1952)];

(4) Adding Lewis acid fluoride to a solution of nitric acid (or alkyl nitrate) and hydrogen fluoride in methane [Canadian Patent No. 643,368].

All of these listed processes for the preparation of solid nitronium salts suffer from one or more of the following defects and/or difficulties: the operations are multistep; nitrogen oxide-based starting materials, e.g., $N_2O_5$ and $NO_2F$, are both expensive and not readily commercially available; the resulting nitronium salts are relatively impure; complicated reactor equipment is needed; the reactions are both difficult and somewhat dangerous to carry out; and more than one mole of Lewis acid fluoride is needed per mole of nitronium salt.

Thus, it is an object of the present invention to provide a new and novel process for the preparation of high purity complex fluoronitronium salts.

It is an additional object of the present invention to provide a safe, straightforward one-step method for the preparataion of complex fluoronitronium salts which permits the use of readily available commercial materials as reactants.

It is a further object of the present invention to provide a method for preparing nitronium salts which does not require complicated reaction apparatus nor the prior preparation of either nitryl fluoride or nitrogen pentoxide.

These and other objects and advantages of the method of the instant invention will become apparent from the detailed description thereof presented hereinafter.

In general, the method of the instant invention is comprised of introducing nitrylchloride and anhydrous hydrogen fluoride into an appropriate solvent along with a Lewis acid fluoride. The reaction mixture is agitated while being maintained at a temperature ranging from about the freezing point of the mixture to about 20° C. The resulting nitronium salt product, which precipitates in the course of the reaction then is separated from the reaction mixture. The term "Lewis acid fluoride," as used herein, refers to those fluorine-containing materials capable of accepting a pair of electrons in the formation of a bond as set forth by the Lewis theory of acids and bases.

Ordinarily, in the instant invention method, the nitrylchloride and anhydrous hydrogen fluoride will be carried in a nitroalkane (e.g., nitromethane, nitroethane, nitropropane, nitrobutane) or sulfur dioxide solvent. However, use of these latter compounds is not essential as an excess of the anhydrous hydrogen fluoride itself can be used as a solvent for the reactants.

Preferably, as indicated heretofore, the Lewis acid substance employed in the reaction to form the salt will be a fluoride compound and ordinarily will be a polyfluoride compound of the general formula, $MF_n$, wherein the second member M is a metal, metalloid or non-metallic species selected from groups III to V, inclusive, of the Periodic Table and $n$ is an integer equal to the valence state of the substance M in the polyfluoride. Examples of a few useful Lewis acid nitronium salt formers are boron trifluoride, phosphorus pentafluoride, silicon tetrafluoride, stannic fluoride, antimony pentafluoride, arsenic pentafluoride and the like.

The anhydrous hydrogen fluoride to be used preferably is selected from those substantially anhydrous materials which assay from about 98 to about 100 percent hydrogen fluoride.

Nitrylchloride, one of the starting materials of the method of this invention, is prepared easily and in good yield by the interaction of nitric acid and chlorosulfonic acid.

In actual operation of the method, the relative proportion of nitrylchloride to anhydrous hydrogen fluoride in the initial solution is preferably about 1:1. The use of excess hydrogen fluoride offers no advantage. If hydrogen fluoride is also used as solvent, the mole ratio of

ranges from about 2 to 100. Ordinarily, reaction mixtures utilizing about stoichiometric quantities of hydrogen fluoride and nitrylchloride will be employed. The ratio of the Lewis acid to the nitrylchloride ranges from about 1 to about 1.5 times the stoichiometric molar quantities needed for salt production.

The amount of either a nitroalkane containing from 1 to 4 carbon atoms, sulfur dioxide or excess hydrogen fluoride solvent to be used is not critical. Generally, the amount of solvent utilized will be up to about 300 grams per mole of the reactants present.

The upper operative limit of temperature is the boiling point of the hydrogen fluoride, about 20° C. at atmospheric pressure, and the lower limit is the freezing point of the reaction mixture, i.e., from about minus 30° to about minus 50° C. A preferred operating temperature range is from about minus 30° to about 0° C. If higher pressures are employed, correspondingly higher temperatures may be employed.

The process can be carried out in reactor vessels or flasks of silica, polyethylene, stainless steel or other materials which do not undergo a prohibitive amount of corrosive attack in the presence of the reactants. Control of the reaction temperature within the desired limits can be achieved through the use of a reactor with internal cooling means or by coupling an external cooling means to a given reactor.

The solid nitronium salts as produced are of a very high purity. These can be removed from the reaction mixture by conventional means such as filtration, centrifugation and the like, and then dried directly. However, if desired, the separated salts can be washed with a small amount of one of the aforementioned solvents and any residual wash material then simply removed under reduced pressure.

The nitronium salts find use as oxidizers in high energy fuels and as nitrating agents for aromatic organic compounds especially if anhydrous media are required. The products produced by the method of the instant invention are especially suitable for any process or utility requiring extremely high purity nitronium salts.

The following examples will serve to further illustrate the method of the present invention but are not meant to limit it thereto.

*Example I*

A solution of 0.5 mole of nitrylchloride and 0.5 mole of anhydrous hydrogen fluoride in 300 grams of liquid sulfur dioxide was placed into a silica flask. 0.5 mole of antimony petafluoride was added to and dissolved in said solution while said solution was vigorously stirred. The temperature of the mixture was maintained within the range of from about minus 30° to about minus 15° C. As this addition was being made, a white, solid precipitate of nitronium hexafluoroantimonate precipitated in the reaction flask. After the addition of antimony pentafluoride was completed, the sulfur dioxide solvent was evaporated by maintaining the mixture at a temperature of from about minus 10° to about 0° C., collected and reused for subsequent reactions. The white solid precipitate was then purified by removing traces of sulfur dioxide or any volatile impurity under reduced pressure. The product yield, based on the amount of nitrylchloride reactant, was about 100 percent.

*Example II*

Using the same technique and procedural steps as set forth in Example I, 0.5 mole of gaseous boron trifluoride was added to a mixture of 0.5 mole of nitrylchloride and 0.5 mole of anhydrous hydrogen fluoride dissolved in 200 grams of cold nitromethane. In this preparation, the temperature of the reaction mixture was kept between minus 20° and 0° C. during the reaction. The white solid precipitate so formed was filtered and washed with 30 milliliters of low-boiling Freon 113 halofluorocarbon. In a number of runs, a product yield of from 95 to 98 percent nitronium tetrafluoroborate was obtained.

*Example III*

In a manner similar to that described in Examples I and II, nitronium hexafluorophosphate can be prepared by introducing phosphorus pentafluoride into a solution of nitrylchloride dissolved in anhydrous hydrogen fluoride, the mole ratio of HF:NO₂Cl being within the range of from about 2 to about 100 while maintaining the reaction temperature between from about minus 30° to about plus 10° C., the molar ratio of said phosphorus pentafluoride:nitrylchloride in the reaction mixture being about 1:1.

In a manner similar to that described in the foregoing experiments, nitronium hexafluoroarsenate, hexafluorosilicate and hexafluorostannate can be produced by reacting substantially stoichiometric quantities of the corresponding Lewis acid fluoride with nitrylchloride in the presence of excess hydrogen fluoride. As previously mentioned, nitroalkanes or sulfur dioxide may be used as the solvent thus eliminating the necessity of using more than stoichiometric quantities of hydrogen fluoride in the reaction.

Various modifications may be made in the instant invention without departing from the spirit or scope thereof for it is to be understood that I limit myself only as defined in the appended claims.

What is claimed is:

1. A method for preparing high purity fluoronitronium salts which comprises introducing a fluorine-containing Lewis acid substance into a solution of nitrylchloride and substantially anhydrous hydrogen fluoride dissolved in a solvent selected from the group consisting of nitroalkanes containing from 1 to 4 carbon atoms and sulfur dioxide while maintaining the temperature of the reaction mixture between about 20° C. and the freezing point of the mixture and precipitating the fluoronitronium salt in the reaction mixture, said Lewis acid substance being a fluoride compound selected from the group consisting of boron trifluoride, phosphorus pentafluoride, silicon tetrafluoride, stannic fluoride, antimony pentafluoride and arsenic pentafluoride, the relative proportion of said nitrylchloride and substantially anhydrous hydrogen fluoride in the initial reaction solution being about 1:1 on a molar basis and the ratio of said Lewis acid to said nitrylchloride ranging from about 1 to about 1.5 of the stoichiometric molar quantity needed for salt production.

2. The method in accordance with claim 1 including the additional steps of separating and recovering the fluoronitronium salt from the reaction mixture.

3. A method for preparing high purity fluoronitronium salts which comprises introduing a Lewis acid fluoride compound into a solution of nitrylchloride and substantially anhydrous hydrogen fluoride dissolved in a solvent selected from the group consisting of nitroalkanes containing from 1 to 4 carbon atoms and sulfur dioxide while maintaining the reaction temperature between about minus 30° C. and plus 20° C., said Lewis acid being a member selected from the group consisting of boron trifluoride, phosphorus pentafluoride, silicon tetrafluoride, antimony pentafluoride, arsenic pentafluoride and stannic fluoride, the relative proportion of said nitrylchloride to said hydrogen fluoride in the initial reaction solution being 1:1 on a molar basis and the ratio of said Lewis acid fluoride to said nitrylchloride ranging from about 1 to about 1.5 of the stoichiometric molar quantity needed for production of said high purity nitronium salt.

4. The method in accordance with claim 3 including the additional steps of separating and recovering the fluoronitronium salt from the reaction mixture.

5. A method for preparing high purity nitronium tetrafluoroborate which comprises:
  (a) introducing boron trifluoride into a solution of nitrylchloride and substantially anhydrous hydrogen fluoride dissolved in nitromethane while maintaining the reaction temperature between from about minus 20° and 0° C., the molar ratio of said boron trifluoride:nitrylchloride:hydrogen fluoride in the reaction mixture being about 1:1:1; and
  (b) separating the resulting high purity nitronium tetrafluoroborate from the reaction mixture.

6. A method for preparing high purity nitronium hexafluoroantimonate which comprises:
  (a) introducing antimony pentafluoride into a solution of nitrylchloride and substantially anhydrous hydrogen fluoride dissolved in sulfur dioxide while maintaining the reaction temperature between from about minus 30° and minus 15° C., the molar ratio of said antimony pentafluoride:nitrylchloride:hydrogen fluoride in the reaction mixture being about 1:1:1; and (b) separating the resulting high purity nitronium hexafluoroantimonate from the reaction mixture.

References Cited

UNITED STATES PATENTS 3,185,542   5/1965   Yodis _____ 23—203

FOREIGN PATENTS 812,247   8/1951   Germany.

OTHER REFERENCES

Maddock et al., "Recent Aspects of the Inorganic Chemistry of Nitrogen," 1957, p. 28.

Ryss, "The Chemistry of Fluorine and its Inorganic Compounds," 1960, pp. 255, 256, 279a.

Seel et al., "Chimia," vol. 16, No. 9, pp. 290–291, 1962.

MILTON WEISSMAN, *Primary Examiner.*